United States Patent

[11] 3,611,813

| [72] | Inventor | Dale Brocker<br>19525 Forest Ave., Castro Valley, Calif. 94546 |
|---|---|---|
| [21] | Appl. No. | 13,185 |
| [22] | Filed | Feb. 20, 1970 |
| [45] | Patented | Oct. 12, 1971<br>Continuation of application Ser. No. 727,911, May 9, 1968, abandoned |

[54] TACHOMETER
2 Claims, 4 Drawing Figs.

| [52] | U.S. Cl. | 73/518,<br>324/173, 336/123, 340/196 |
|---|---|---|
| [51] | Int. Cl. | G01p 3/44 |
| [50] | Field of Search | 73/488,<br>518; 324/70 CG; 340/196; 336/121–123;<br>323/51–53 |

[56] References Cited
UNITED STATES PATENTS

| 2,671,892 | 3/1954 | Childs | 340/195 |
|---|---|---|---|
| 3,121,839 | 2/1964 | Malenick et al. | 324/61 |
| 3,221,256 | 11/1965 | Walden | 340/200 |
| 3,377,556 | 4/1968 | Corcoran | 324/70 |
| 3,384,816 | 5/1968 | Romberg | 324/70 |

*Primary Examiner*—Richard C. Queisser
*Assistant Examiner*—Herbert Goldstein
*Attorney*—Paul B. Fihe ABSTRACT: A tachometer including a fixed pattern having an input signal applied thereto, and a cooperating rotary pattern arranged to modulate the input signal at a rate proportional to the rate of rotation.

PATENTED OCT 12 1971  3,611,813
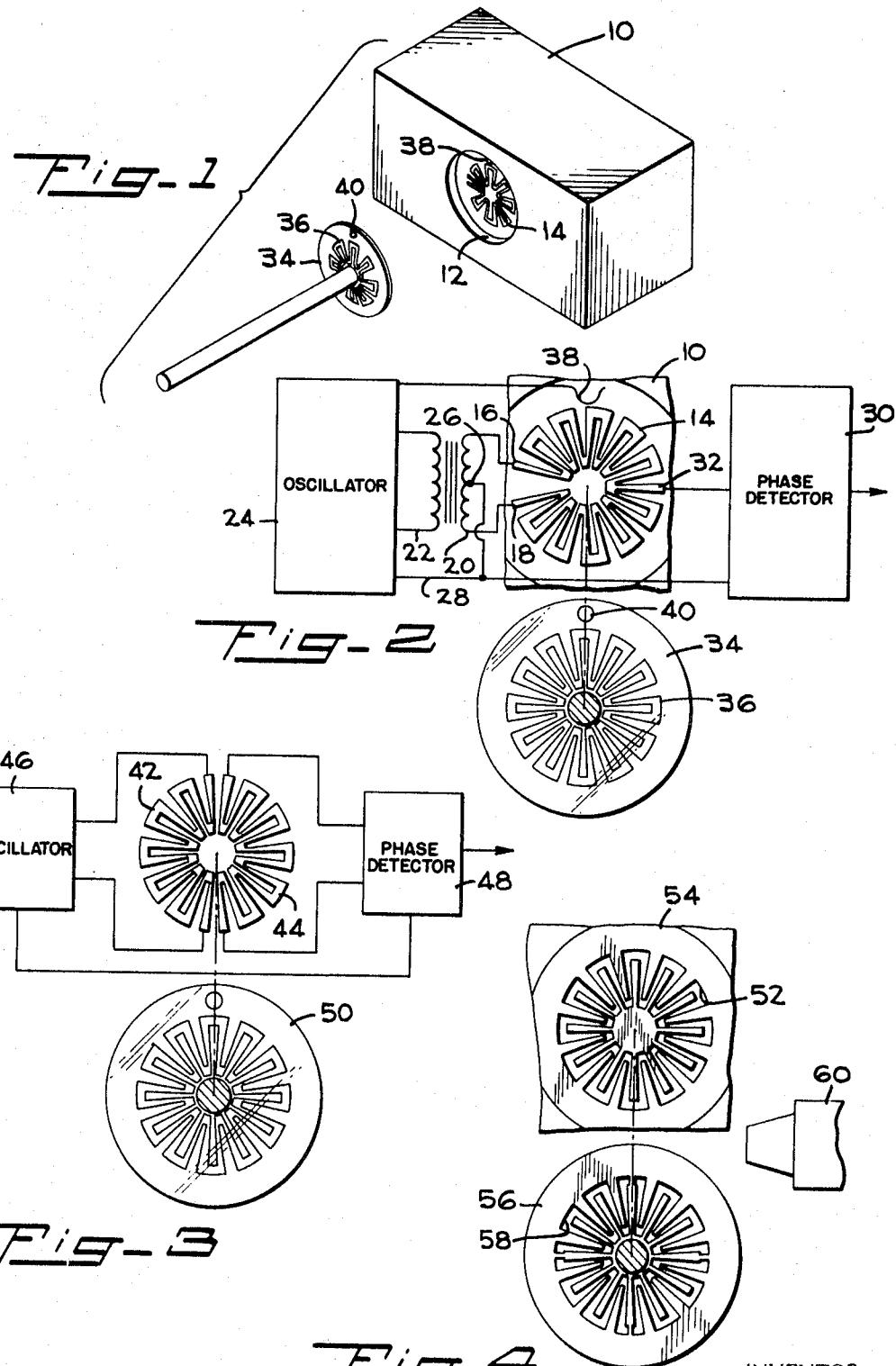
INVENTOR.
DALE BROCKER
BY
PATENT AGENT 3,611,813

TACHOMETER

This application constitutes a continuation of my prior application Ser. No. 727,911, filed May 9, 1968.

The present invention relates generally to tachometers and, more particularly, to a small tachometer capable of recording with extreme accuracy rotary speeds over an extremely large range up to 300,000 r.p.m. or more.

BACKGROUND OF THE INVENTION

As the speed of rotation of any unit increases, the problems attendant to reading and recording such speed, in turn, become increasingly difficult. For example, determining and recording the revolutions per minute on an automobile engine, whose range is typically from 0 to 6,000 r.p.m., is a relatively simple matter and acceptable tachometers have been in existence for some time. However, the rotation of an ultracentrifuge whose top speed may approach 100,000 r.p.m. is, because both of such top speed and the wide speed range, much more difficult to determine and record. Bearing wear, shaft misalignment, and similar mechanical difficulties which present minor problems at low speeds, at higher speeds, present vibration problems, problems of momentum, and many other difficulties. Consequently, for higher speeds, tachometers of a nonmechanical nature employing, for example, photocells have been utilized, but these too are relatively fragile and subject to frequent failure.

SUMMARY OF THE INVENTION

Accordingly, it is a general objective of the present invention to provide a small compact tachometer capable of reliable accurate recording to rotary speeds over an extremely large range, for example, from 0 to 300,000 r.p.m. Briefly, an input signal, which can be electrical or mechanical, is supplied to a fixed member having a circular cyclical pattern thereon and which is arranged in adjacent cooperative relationship with a generally similar circular cyclical pattern on a rotary member which is suitably connected to an ultracentrifuge or other unit whose speed is to be determined and recorded. Rotary motion of the rotary member is arranged to modulate the input signal as the relative rotary dispositions of the two patterns changes and the modulated output signal is then appropriately detected, the rate of modulation, of course, being proportional to the rate of rotation of the ultracentrifuge or other unit whose rate of rotation is to be recorded.

BRIEF DESCRIPTION OF THE DRAWING

The stated objective of the invention and the precise manner in which it can be achieved will be more readily understood from a perusal of the following detailed description of several specific embodiments as shown in the accompanying drawing wherein:

FIG. 1 is an exploded perspective view of the mechanical arrangement of a tachometer embodying the present invention, FIG. 2 is an electrical diagram of the FIG. 1 tachometer, FIG. 3 is an electrical circuit diagram corresponding to FIG. 2 of a modified embodiment of the invention, and FIG. 4 is a diagrammatic view of yet a third embodiment of the invention.

DETAILED DESCRIPTION OF THE EXEMPLARY EMBODIMENT

With initial reference to FIG. 1, a relatively small rectangular block 10 composed of insulating material is provided with a cup-shaped cylindrical recess 12. In the flat bottom of the recess 12, conductors 14 are embedded in a cyclical circular pattern. More particularly, this pattern, as more clearly shown in FIG. 2, can take the form of an arcuately distorted generally sinusoidal pattern including relatively long radial sections joined alternately by relatively short circumferential sections at their inner and outer extremities. The cyclical circular pattern on the block 10 is discontinuous on the left so as to form two sections 16, 18, the uppermost of which is joined to one end of the secondary 20 of a transformer and the other of which is electrically connected to the opposite end of the transformer secondary. The primary 22 of the transformer is supplied with an input electrical signal from an oscillator 24 which can operate at any frequency, for example, 10 megacycles per second. A center tap 26 from the transformer secondary 20 is connected to another conductor 28 that joins the oscillator 24 to a phase detector 30 which also is electrically connected to the common junction 32 of the two cyclical pattern sections 16, 18, thus establishing what is, in effect, a bridge circuit with the two sections of the circular cyclical pattern forming two legs of the bridge. The two sections 16, 18 of the pattern forming the two legs of the bridge circuit are electrically identical, having the same basic electrical impedance so that if a signal is applied thereto from the oscillator 24, the bridge is balanced and a zero output signal is supplied to the phase detector 30.

In this embodiment of the invention, the input signal from the oscillator 24 applied to the bridge circuit is modulated by periodically unbalancing the bridge through the expedient of placing a rotary member 34 having a similar cyclical circular conductor 36 embedded in an insulating disk which can be physically inserted into the cylindrical recess 12 so as to be capable of rotation immediately adjacent the fixed circular cyclical pattern. The cyclical circular pattern on the rotary disk 34 is formed by a continuous conductive member having a regular sinusoidal pattern corresponding generally to that of the fixed pattern. However, the lower section 18 of the fixed pattern is angularly displaced relative to the upper section 16 wherefore if the pattern on the disk 34 is aligned with the upper pattern section 16 forming one leg of the bridge circuit, the pattern on the lower portion of the disk will be displaced angularly relative to the lower pattern section 18. A thin layer of insulating material is placed over the surface of the disk 34 so that no direct contact between the conductive patterns is achieved but there is sufficient proximity between the pattern on the rotary member 34 and the pattern sections 16, 18 on the fixed block 10 so as to effect an impedance change depending upon the particular relative rotative positions of the two patterns. Accordingly, as the rotary member 34 revolves, the impedance values of the two legs of the electrical bridge circuit vary to unbalance the bridge and thus provide a cyclical output that is detected by the phase detector 30. Quite obviously, as the speed of rotation of the rotary member 34 increases, the frequency of modulation increases which, in turn, is detected and is representative of the particular rotative speed of the rotary member at any time. Since the rotary member 34 is, in turn, connected in some suitable fashion to an ultracentrifuge or other unit whose speed of rotation is to be measured, an accurate tachometric reading is provided regardless of the rotary speed being measured.

The oscillator 24 is shown only in block diagram since it can be of standard configuration and it is to be once again emphasized that frequency of its operation need be of no particular value, nor indeed need it be stable in frequency or amplitude. The phase detector 30 is also of standard configuration so that it is only shown in block diagram and other forms of detectors of the modulation rate can be utilized although it has been found in practice that a phase detector provides the most accurate output information.

As shown in FIGS. 1 and 2, a small coil 38 can be embedded in the block 10 adjacent the exterior of the circular pattern and is supplied with radiofrequency energy from the oscillator 24 or other suitable source. A conducting slug or circle 40 is, in turn, embedded in the rotary member 34 so as to pass the coil 38 on each revolution and provide a load which reflects an electrical pulse that can be suitable detected and utilized as an indexing pulse when desired.

Whereas the FIGS. 1 and 2 embodiments operate on the specific principle of the periodic unbalancing of a bridge circuit, it will be obvious that other electrical modulation of an input electrical signal can be utilized to provide the same ultimate result. As one example, specific reference is made to FIG. 3 wherein the general physical arrangement of the unit can be similar to that shown in FIG. 1 but the specific principle of operation relates to the variance in the coupling between conductive input and output pattern sections 42, 44. More particularly, as shown in FIG. 3, an oscillator 46 is arranged to deliver an input signal of any desired frequency to the input section 42 of a circular cyclical pattern having the same distorted sinusoidal pattern which is, in turn, electrically separated from a generally symmetrical output pattern section 44 which is, in turn, connected electrically to a phase detector 48. Although electrically separated, the two sections 42, 44 form part of an overall circular pattern which is physically regular throughout its entire circumference. A rotary member 50, which can be identical with that described in connection with the first embodiment of the invention, is placed adjacent to the fixed input and output sections 42, 44 and as it rotates, varies the amount of link coupling between the input and output sections so as to cyclically vary the phase and amplitude of the output signal delivered to the phase detector 48. Obviously then, as the speed of rotation of the rotary member 50 increases, the frequency of the output wave form increases and this is recorded to accurately present the rotary speed of the unit being measured.

While the described two embodiments are similar in that the modulation of electrical signals is provided, it will be understood that modulation of other input signals can be similarly applied to ultimately provide the required measurement and recording of speed. With reference to FIG. 4, an alternate embodiment is shown which employs essentially the principle of a standard air gauge. A fixed pattern 52 is mounted on a block 54, the pattern being apertured to permit air flow therethrough and, in turn, the rotary member 56 is in the form of a disk having a circular cyclical pattern 58 of an identical nature and having apertures formed through the disk to form the pattern sections, thus to enable variation in the potential passage of air depending upon the rotative displacement of the fixed and rotative patterns 52, 58. A standard air gauge 60 can be arranged to direct flow at the adjacent fixed and rotary members 54, 56 and, depending upon the restriction of airflow, the back pressure is modulated and subsequently recorded by the air gauge 60 and the frequency of pressure variation can, in turn, be correlated with the speed of a unit suitably connected to the rotary disk.

Obviously, many further modifications and/or alterations can be made in the structures as described without departing from the general spirit of the invention, and the foregoing description of three embodiments is accordingly considered as purely exemplary and not in a limiting sense. The actual scope of the invention is to be indicated only by reference to the appended claims.

What is claimed is:

1. A motion indicating device which comprises, means for generating an input electrical signal, a bridge circuit connected to said input signal means and including a fixed electrical conductor in the form of connected similar cyclical pattern sections, one section of which is angularly offset relative to the other section, the two pattern sections forming two legs of said bridge, the input connection from said signal means being to the ends of said conductor and an output connection being made between the two pattern sections thereof, and means for modulating the electrical signal on said fixed conductor including a movable member having a similar cyclical pattern supported for movement sufficiently close to said pattern sections to disturb the electromagnetic fields generated by the electrical input signal thereon, said fixed and movable patterns being disposed so that when the movable pattern is aligned with the first pattern section forming one leg of said bridge circuit, the other portion of said movable pattern is out of alignment with the pattern section forming the other leg of said bridge circuit wherefore differential impedances exist to unbalance the bridge.

2. A motion indicating device which comprises, means for generating an input electrical signal, a fixed cyclical pattern electrical conductor arranged in two electrically separate sections, one section being connected at its ends to said signal generating means, the other section having output connections at its ends, and a movable member having a cyclical pattern disposed sufficiently close to said fixed pattern to affect the electromagnetic fields generated by an electrical signal so as to modulate the same upon movement thereof.